United States Patent
Bunn et al.

(10) Patent No.: US 6,580,971 B2
(45) Date of Patent: Jun. 17, 2003

(54) MULTIPOINT INSPECTION SYSTEM

(75) Inventors: Shayne J. Bunn, Lowell, MI (US); James O. Jongekryg, Grand Rapids, MI (US); Keith R. Rollenghagen, Walker, MI (US)

(73) Assignee: Thierica, Inc., Kentwood, MI (US)

( * ) Notice: Subject to any disclaimer, the term of this patent is extended or adjusted under 35 U.S.C. 154(b) by 25 days.

(21) Appl. No.: 10/035,837

(22) Filed: Nov. 13, 2001

(65) Prior Publication Data

US 2003/0093183 A1 May 15, 2003

(51) Int. Cl.$^7$ ................................................ G05B 19/00
(52) U.S. Cl. .................. 700/259; 700/95; 700/245; 382/125; 382/159; 382/170; 382/226; 702/84; 706/14; 29/712; 701/23
(58) Field of Search ......................... 700/95, 245, 259; 382/159, 170, 226, 154, 125; 702/84; 706/14; 29/712; 701/23

(56) References Cited

U.S. PATENT DOCUMENTS

| | | | |
|---|---|---|---|
| 4,504,970 A | * | 3/1985 | Werth et al. ................. 382/159 |
| 4,541,115 A | * | 9/1985 | Werth ......................... 382/159 |
| 4,551,850 A | * | 11/1985 | Werth et al. ................. 382/170 |
| 4,825,394 A | * | 4/1989 | Beamish et al. ............. 356/147 |
| 5,917,726 A | | 6/1999 | Pryor ........................... 700/95 |
| 6,064,759 A | | 5/2000 | Buckley et al. ............. 382/154 |
| 2002/0130262 A1 | * | 9/2002 | Nakasuji et al. ............ 250/311 |

OTHER PUBLICATIONS

Cao et al., Time–suboptimal inspection task sequence planning for two cooperative robot arms using mixed optimization algorithms, 1997, IEEE, pp. 2103–2108.*

Olson, NASA–Montana Tech Joint Venture: Calculation the shortest path for a robot to follow in space, 1998, Internet, p. 1.*

* cited by examiner

Primary Examiner—William A Cuchlinski, Jr.
Assistant Examiner—McDieunel Marc
(74) Attorney, Agent, or Firm—Price Heneveld Cooper DeWitt & Litton

(57) ABSTRACT

A multipoint inspection system for evaluating manufactured assemblies includes a robotic arm and a robot controller for controlling the robotic arm. A camera is mounted to an end of the robotic arm and includes a camera controller for capturing images. The robot controller is in communication with the camera controller and the robot controller causes the robotic arm to position the camera at a first inspection point. The camera controller then causes the camera to capture a first inspection point image of a manufactured assembly at the first inspection point. The robotic controller then causes the robotic arm to position the camera at a next inspection point where the camera controller then causes the camera to capture a next inspection point image of the manufactured assembly at the next inspection point.

21 Claims, 6 Drawing Sheets

MULTIPOINT INSPECTION SYSTEM

BACKGROUND OF THE INVENTION

The present invention is generally directed to an inspection system and, more specifically, to a multipoint inspection system.

Traditionally, various manufactured assemblies have been inspected using fixed position cameras that capture an image of a particular location of interest in a manufactured assembly. When multiple points of a manufactured assembly are of interest, a fixed position camera has been implemented to capture an image of each point of interest. For example, an automotive seat undercarriage assembly may have twelve or more points of interest, which an inspection system must examine to determine whether specific components are present and/or if other components, which should not be present, are located at the point of interest.

Unfortunately, utilizing multiple fixed position cameras in a multipoint inspection system does not provide a system that is readily adapted to inspecting different assemblies as such systems typically require time consuming adjustment to set-up the system for initial inspection. Further, a multipoint inspection system that uses fixed position cameras may require mechanical reconfiguration if one or more points of interest of a particular manufactured assembly change. This may require that one or more of the fixed cameras be adjusted, remounted or moved in some manner to accommodate a new or different inspection point position.

Thus, what is needed is a multipoint inspection system that can inspect different assemblies without the need for mechanical adjustment.

SUMMARY OF THE INVENTION

An embodiment of the present invention is directed to a multipoint inspection system for evaluating manufactured assemblies. In one embodiment, the system includes a robot and a camera. The robot includes a robotic arm and a robot controller for controlling the robotic arm. The camera is mounted to an end of the robotic arm and includes a camera controller for capturing images. The robot controller is in communication with the camera controller and causes the robotic arm to position the camera at a first inspection point. The camera controller then causes the camera to capture a first inspection point image of a manufactured assembly at the first inspection point. Next, the robotic controller causes the robotic arm to position the camera at a next inspection point, where the camera controller then causes the camera to capture a next inspection point image of the manufactured assembly at the next inspection point. In one embodiment, the robotic arm is at least a two-axis robotic arm and in another embodiment the robotic arm is one of a three-axis to a six-axis robotic arm.

These and other features, advantages and objects of the present invention will be further understood and appreciated by those skilled in the art by reference to the following specification, claims and appended drawings.

DETAILED DESCRIPTION OF THE PREFERRED EMBODIMENTS

The present invention is directed to a multipoint inspection system for evaluating manufactured assemblies. An advantage of the multipoint inspection system of the present invention is that it can readily handle different manufactured assemblies through reprogramming of a robot and a camera, which is mounted to an end of a robotic arm of the robot. A multipoint inspection system according to the present invention includes a camera controller, typically located within a camera, for capturing images and a robot controller that is in communication with the camera controller. The robot controller causes a robotic arm to position the camera at a first inspection point, at which point the camera controller causes the camera to capture a first inspection point image of a manufactured assembly at a first inspection point. The robot controller then causes the robotic arm to position the camera at a next inspection point, where the camera controller then causes the camera to capture a next inspection point image of the manufactured assembly at the next inspection point. This process is repeated until the inspection of the assembly is complete.

Figure 1:
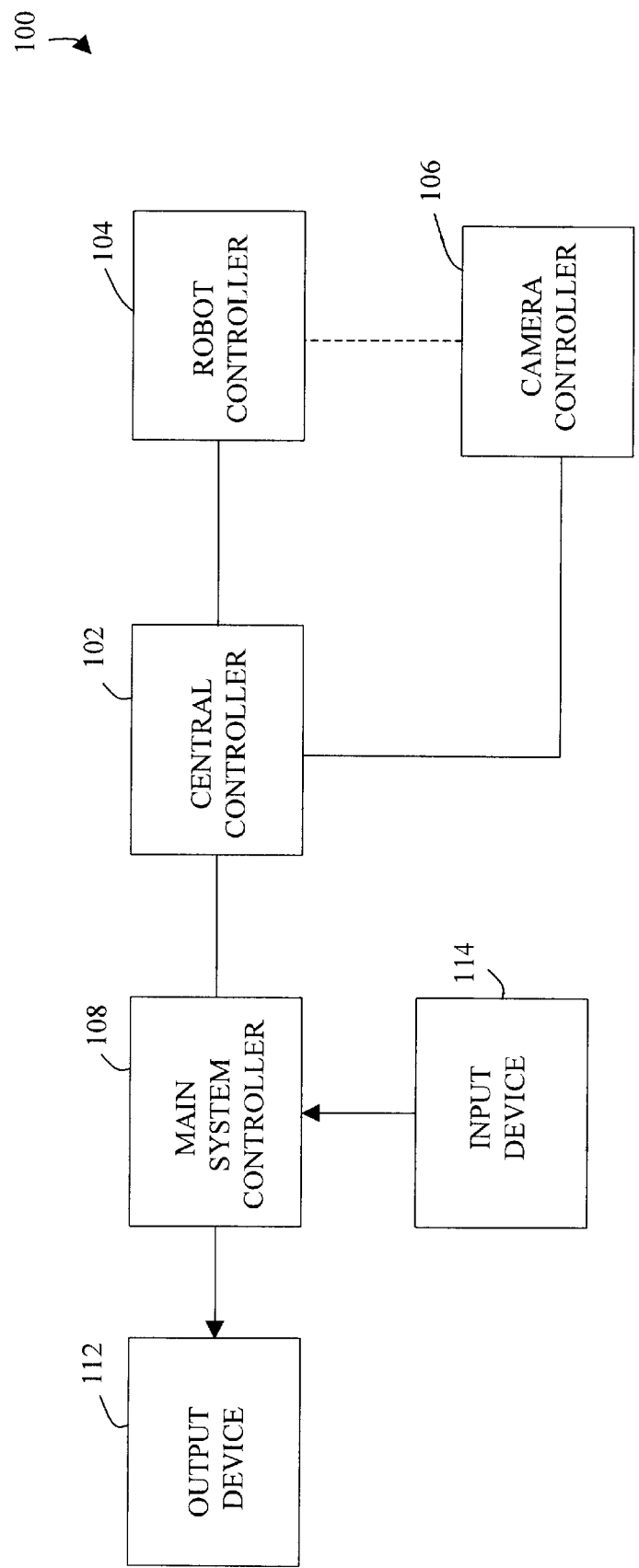
FIG. 1 is an electrical block diagram of an exemplary multipoint inspection system, according to an embodiment of the present invention.

FIG. 1 depicts an exemplary multipoint inspection system 100, according to one embodiment of the present invention. A central controller 102 is coupled to a main system controller 108, a robot controller 104 and a camera controller 106. In one embodiment, the camera controller 106 is part of a camera and the robot controller 104 is part of a robot, which includes a robotic arm. In one embodiment, the main system controller 108 provides information to the central controller 102 as to which manufactured assembly is to be inspected. In this embodiment, the central controller 102 also receives a start signal from the main system controller 108. Upon receiving the start signal, the central controller 102 sends an appropriate signal to the robot controller 104 and the camera controller 106. It should be appreciated that the appropriate signal may be a message on a serial bus or can be initiated by toggling one or more input/output (I/O) lines associated with the central controller 102.

Based upon the signal or signals received from the central controller 102, the robot controller 104 and the camera controller 106 implement appropriate routines. That is, the robot controller 104 executes a routine that causes the robotic arm to move to a manufactured assembly appropriate position such that the camera, controlled by the camera controller 106, can capture an initial inspection point image. In one embodiment, the robot controller 104 sends a signal to the central controller 102 upon reaching the initial inspection point. The central controller 102 then sends a signal to the camera controller 106, which in response to the signal, causes the camera to capture an image of the initial inspection point. In an embodiment, when the camera controller 106 starts the inspection process, the camera controller 106 drives a signal line, coupled to the central controller 102, low. In this embodiment, when the inspection process is complete, the camera controller 106 drives a signal line, coupled to the central controller 102, high.

Upon completion of the inspection process, the camera controller 106 sends a signal to the central controller 102 indicating that the image at the initial inspection point was within inspection parameters if, in fact, the assembly passed the inspection. However, if the grabbed image is not within the inspection point parameters, the camera controller 106 does not drive the signal line, to the central controller 102, high, which indicates that the inspection has failed. Upon completion of the inspection process at the current inspection point, the central controller 102 sends a signal to the robot controller 104, which causes the robot controller 104 to move the robotic arm, and hence the camera, to a next inspection point. Upon reaching the next inspection point, the robot controller 104 sends a signal to the central controller 102, which in response to that signal sends a signal to the camera controller 106, which captures an image of the inspection point in response thereto.

The process as previously described is then repeated until all inspection points have been examined. Upon completing the inspection process, the central controller 102 sends a signal to the robot controller 104, which causes the robotic arm to return to a home position such that a next manufactured assembly can be brought into the inspection area for inspection. The central controller 102 then communicates with the main system controller 108 and indicates whether the recently inspected manufactured assembly has passed the inspection process. If the recently inspected assembly has not passed the inspection process, the main system controller 108 causes an output device 112, for example, a printer, to provide an indication of the inspection points that were out of tolerance. When the output device 112 includes a printer, the printer may provide a bar-coded label, which can then be attached to the failing manufactured assembly.

It should be appreciated that the main system controller 108, the central controller 102, the robot controller 104 and the camera controller 106 can be of varying types. For example, the controllers 102–108 may be a microcontroller, a microprocessor, a programmer logic controller (PLC) or a programmable logic array (PLA) or a combination thereof. It should also be appreciated that the central controller 102 and the main system controller 108 are not required if the robot controller 104 is programmed to perform the functions of the main system controller 108 and the central controller 102. For example, the robot controller 104 may include an input device and an output device coupled directly to the robot controller 104. In this configuration, the robot controller 104 may communicate directly with the camera controller 106. Further, the camera controller 106 may directly provide the image to the robot controller 104, which may perform an image analysis of the image in lieu of the camera controller 106 performing analysis of a given captured image. Thus, it should be appreciated that the electrical block diagram, shown in FIG. 1, is exemplary only and can be simplified with the robot controller 104 performing multiple functions.

In one embodiment, the main system controller 108 and the central controller 102 are manufactured and made commercially available by Alan-Bradley (Part No. SLC5-04). In another embodiment, the camera controller is incorporated within an Omron camera (Part No. F-150). When the central controller 102 is an Alan-Bradley SLC5-04, the robot controller 104 may also be coupled to the central controller 102 through a remote I/O communication pin, using a remote I/O communication protocol, and the central controller 102 may communicate with the camera controller 106 through a hardware I/O pin. When both the main system controller 108 and the central controller 102 are implemented as Alan-Bradley SLC5-04 PLCs, the main system controller 108 and the central controller 102 may communicate through data highway plus, which is an Alan-Bradley communication protocol. In one embodiment, the robot controller 104 is incorporated within a robot having a robotic arm for which a suitable robot is an SV3X manufactured and made commercially available by Motoman.

Figure 2:
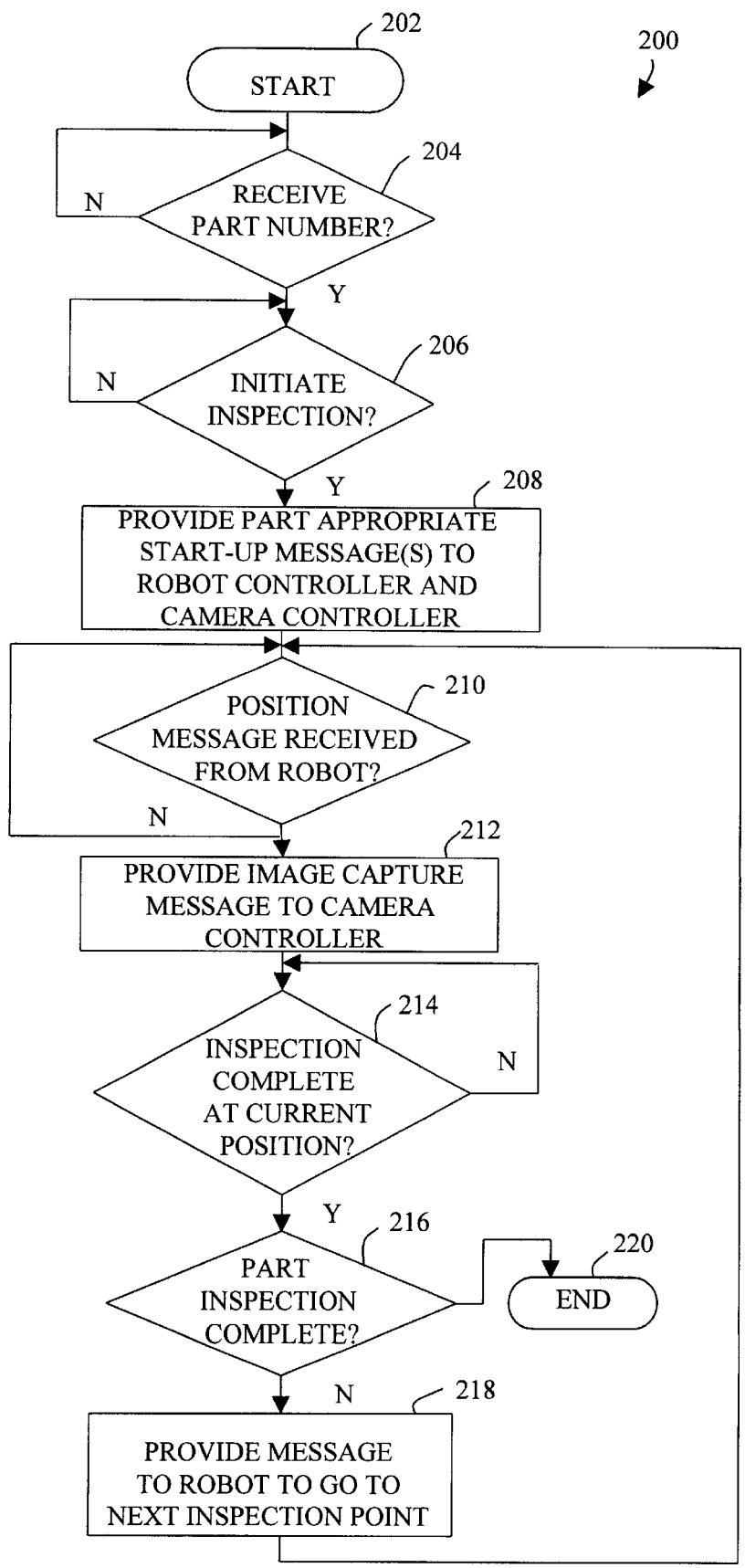
FIG. 2 is a flowchart of an exemplary multipoint inspection system routine, which executes on a central controller.

FIG. 2 depicts a flowchart of an exemplary multipoint inspection system routine 200, which, according to one embodiment, implements on the central controller 102. In step 202, the routine 200 is initiated. Next, in decision step 204, the central controller 102 receives an assembly number from the main system controller 108. When the assembly number is received in step 204, control transfers to decision step 206. When the assembly number has not been received in step 204, the routine 200 loops on step 204 until an assembly number is received. In step 206, the central controller 102 determines whether it has received a command to initiate inspection (e.g., a start signal) from the main system controller 108. If so, control transfers to step 208. Otherwise, control loops on step 206.

In step 208, the central controller 102 provides an assembly appropriate start-up message or messages to the robot controller 104 and the camera controller 106. Next, in decision step 210, the central controller 102 determines whether a position message has been received from the robot. The position message from the robot, which is discussed further in conjunction with FIG. 3, indicates to the central controller 102 that the robot controller 104 has caused the robotic arm to move the camera into a first inspection point position. When the message is received from the robot controller 104 indicating it is in position, control transfers from step 210 to step 212. Otherwise, control loops on step 210 until a message is received from the robot controller 104 indicating that it has moved the robotic arm and the camera to a first inspection point position. Next, in step 212, the central controller 102 provides an image capture message to the camera controller 106. Then, in step 214, the central controller 102 determines whether the inspection is complete at the current position. If so, control transfers from step 214 to decision step 216. Otherwise, control loops on decision step 214 until a signal is provided from the camera controller 106 to the central controller 102 indicating that the inspection is complete at the current inspection point.

In step 216, the central controller 102 determines whether the assembly inspection is complete. If so, control transfers from step 216 to step 220. Otherwise, control transfers from step 216 to step 218. In step 218, the central controller 102 provides a message to the robot controller 104, which causes the robot controller 104 to position the robotic arm at a next inspection point. From step 218, control transfers to step 210. As previously described, in step 210, the central controller 102 waits to receive a message from the robot controller 104 indicating that the robot controller is at an appropriate position before providing a message, in step 212, to the camera controller 106 to capture an image of the current inspection point.

Figure 3:
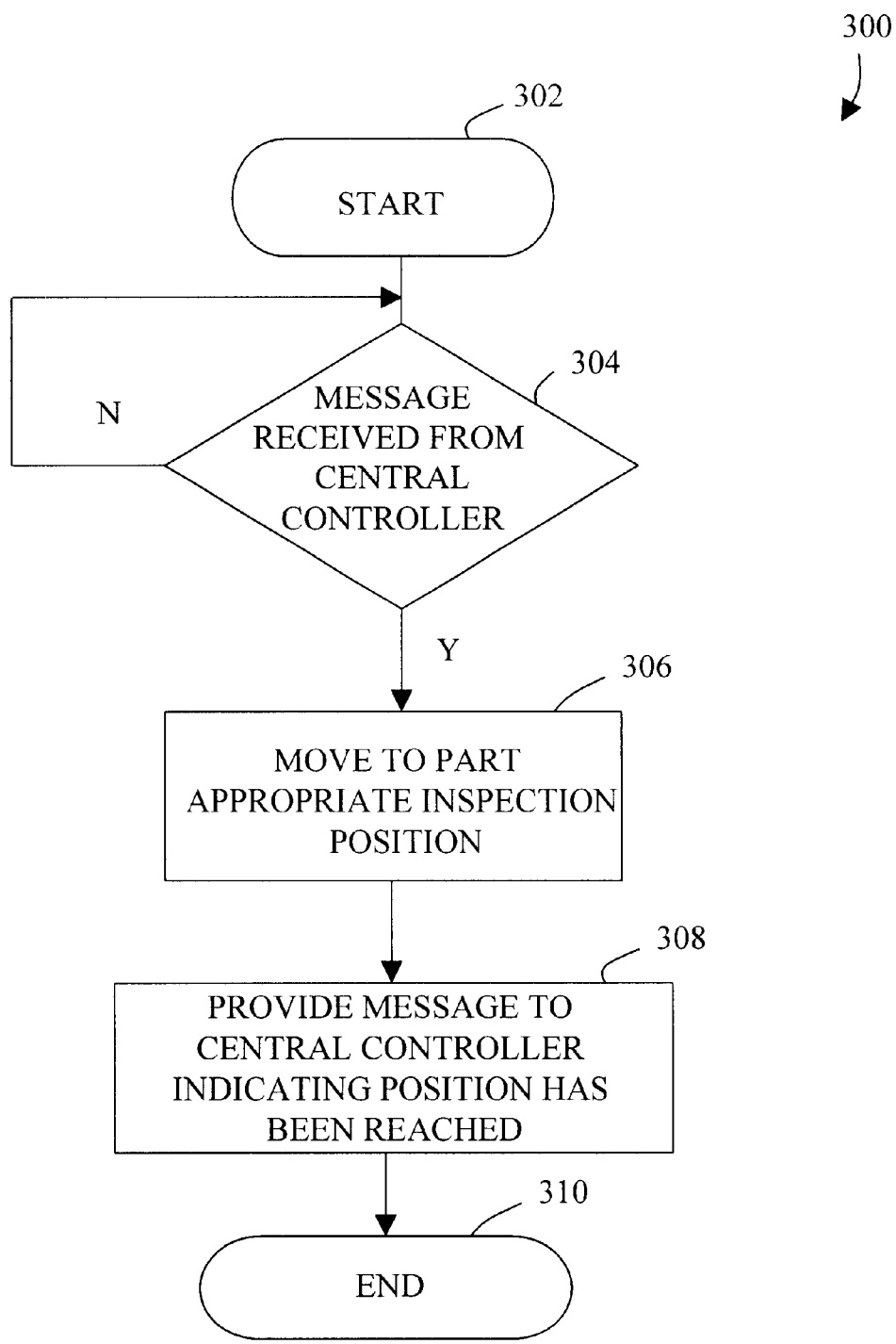
FIG. 3 is a flowchart of an exemplary routine, which executes on a robot controller.

FIG. 3 shows a flowchart of an exemplary routine 300, which executes on the robot controller 104. In step 302, the routine 300 is initiated. Next, in decision step 304, the robot controller 104 determines whether a message has been received from the central controller 102. If so, control transfers to step 306. Otherwise, control loops on step 304 until a message is received from the central controller 102. In step 306, the robot controller 104 causes the robotic arm to move to an assembly appropriate inspection position. Next, in step 308, the robot controller 104 provides a message to the central controller 102, which indicates that the inspection position has been reached. Then, in step 310, the routine 300 terminates.

Figure 4:
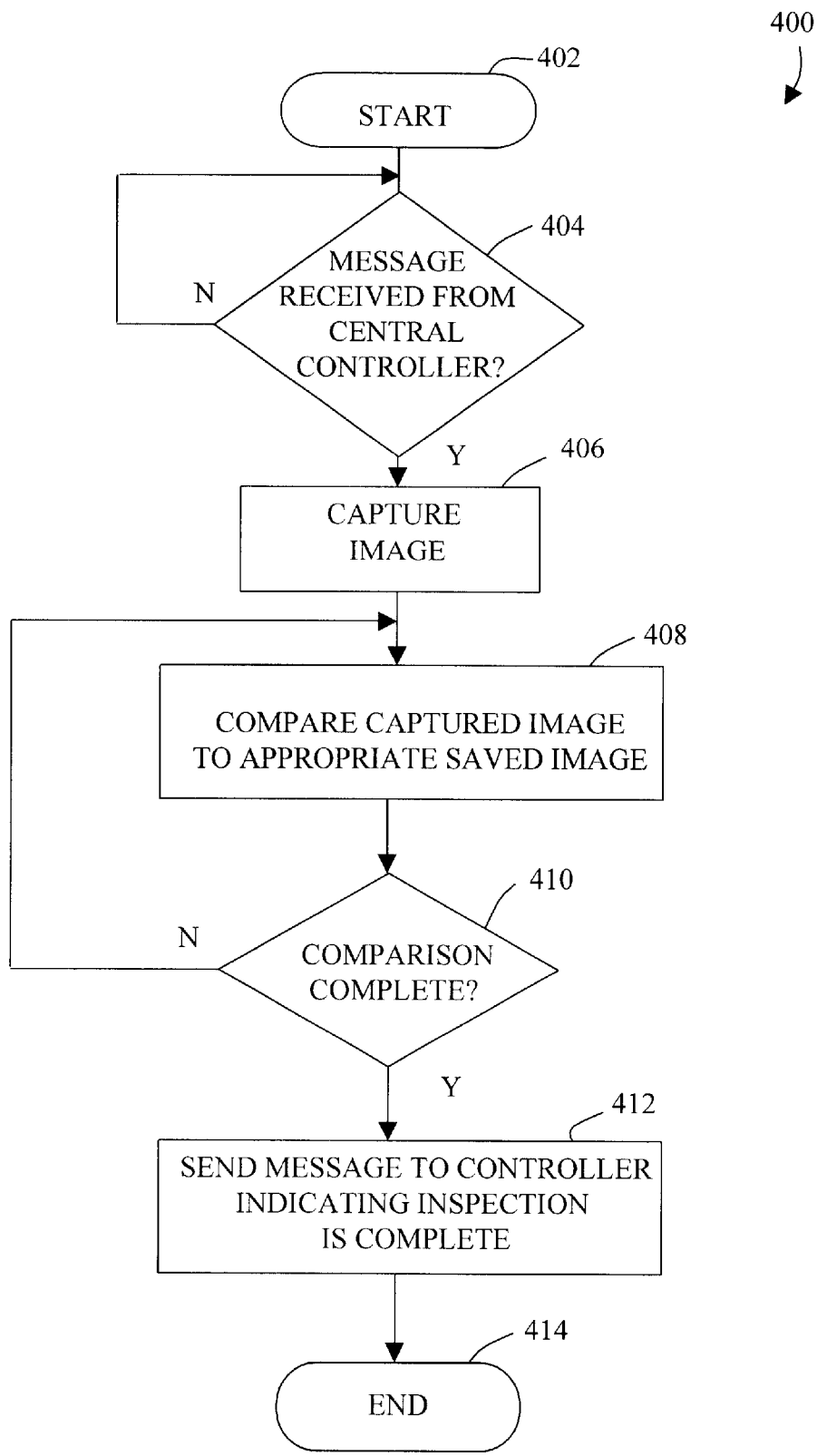
FIG. 4 is a flowchart of an exemplary routine, which executes on a camera controller.

FIG. 4 depicts a flowchart of an exemplary routine 400, which executes on the camera controller 106, according to an embodiment of the present invention. In step 402, the routine 400 is initiated at which point control transfers to decision step 404. In step 404, the camera controller 106 determines whether a message has been received from the central controller 102 indicating that the camera controller 106 should capture an image of a current inspection point. The camera controller 106 loops on step 404 until a message has been received from the central controller 102. When a message is received from the central controller 102, indicating that an image is to be captured at a current inspection point, control transfers to step 406 where the camera controller 106 causes an image to be captured.

Next, in step 408, the camera controller 106 compares the captured image to an appropriate saved image. The comparison can occur in a number of ways, for example, the camera controller 106 can implement an algorithm that checks for appropriate edge pixels or do a complete comparison of the captured image within a stored image. Preferably, the camera controller 106 performs an edge-checking algorithm on the captured image, which indicates whether the appropriate edge pixels of the captured image are within tolerance. Next, control transfers to decision step 410 where the camera controller 106 determines whether the comparison is complete. If the comparison is complete, control transfers to step 412. Otherwise, control transfers from step 410 to step 408, where the comparison of the captured image to the appropriate saved image continues.

In step 412, upon completion of the comparison, the camera controller 106 sends a message to the controller indicating the inspection is complete. The camera controller 106 may also indicate to the central controller 102 whether the current captured image was within component tolerances. Next, in step 414, the routine 400 terminates.

Figure 5:
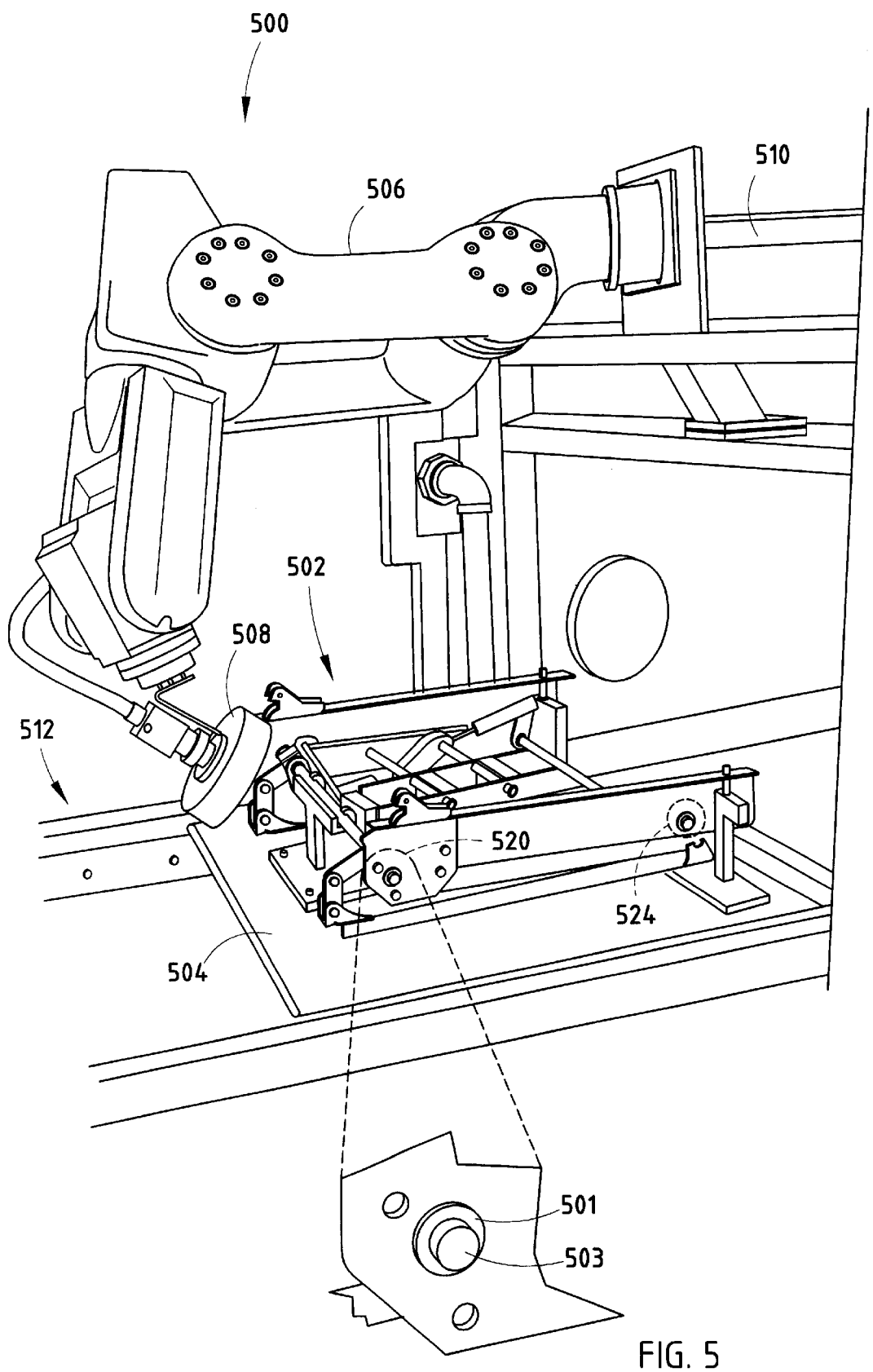
FIG. 5 is a view of an exemplary multipoint inspection system.

FIG. 5 depicts an exemplary multipoint inspection system 500, according to an embodiment of the present invention. As shown in FIG. 5, a robotic arm 506 is mounted at one end to a stationary frame 510. The other end of the robotic arm 506 is coupled to a camera 508 that is used to perform the various inspections of a manufactured assembly 502, which in this case, is an automotive seat assembly. The manufactured assembly 502 is retained on a conveyor 512 by a fixture 504. In this manner, a plurality of manufactured assemblies mounted to fixtures 504 can be brought into an inspection area.

Exemplary inspection points 520 and 524 are shown in FIG. 5. As shown at inspection point 520, a shaft 503 includes a washer 504 mounted on the shaft 503. When inspecting the inspection point 520, a captured image is compared to detect whether the washer 501 is mounted on the shaft 503. This is required to verify whether a component, for example, the washer, is mounted on the shaft 503 before the manufactured assembly is delivered to a last assembly station for a final assembly step which, in this example, is the penning or brading of the shaft 503 to retain the washer and other components mounted on the shaft 503. It will be appreciated that brading the end of the shaft 503 is in essence an irreversible process that results in the manufactured assembly 502 being scrapped if a washer 501 is not present on the shaft 503 when the end of the shaft 503 is braded. According to one embodiment of the present invention, if one or more components are not present or additional components are present at any inspection point, a label is printed, which indicates the particular failure. An operator of the system can then place the label on the failed manufactured assembly 502. This enables a manufacturer to rework the assembly before it has reached a state in which the assembly is scrapped.

Figure 6:
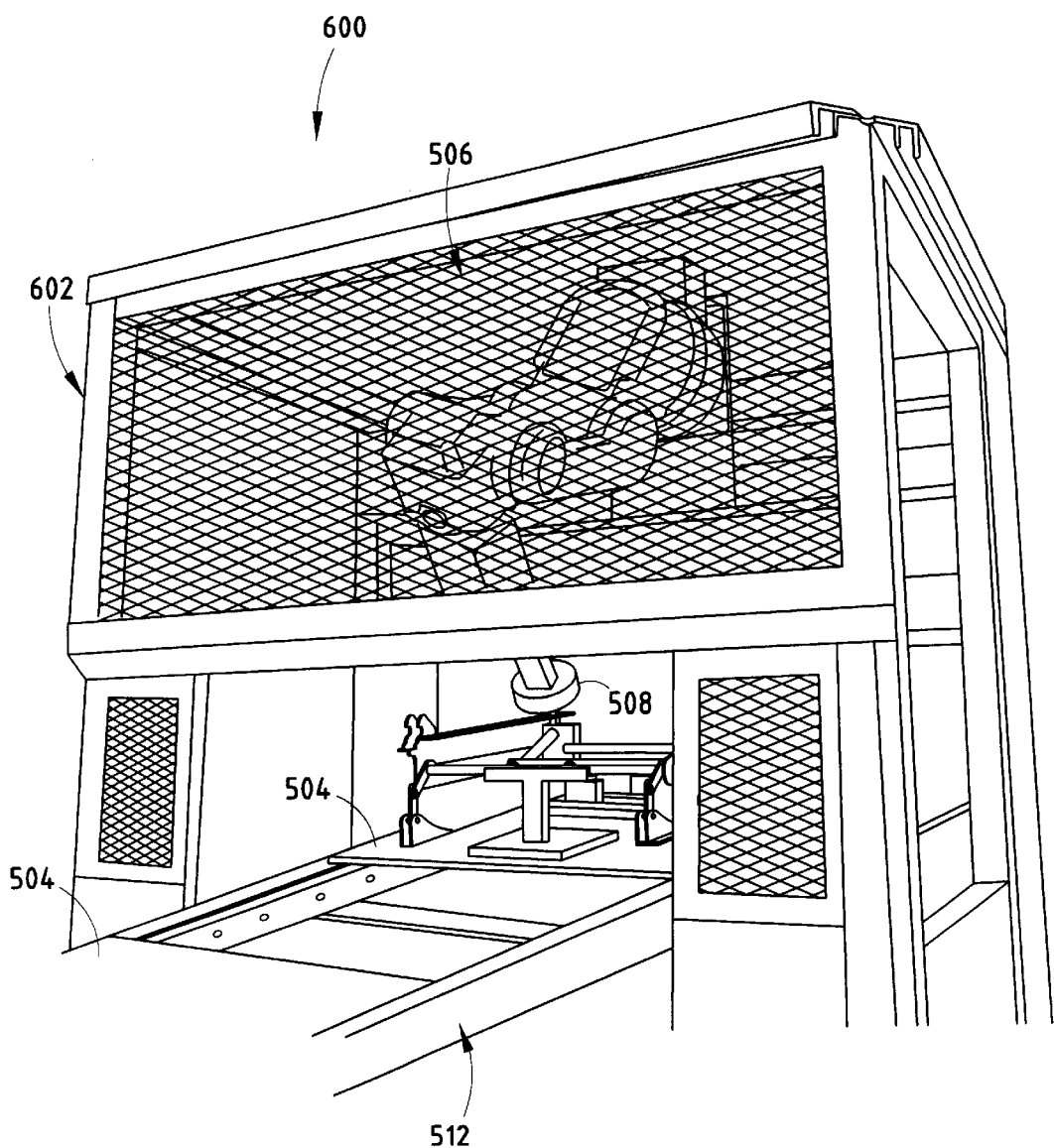
FIG. 6 is a view of an exemplary multipoint inspection system, according to another embodiment of the present invention.

FIG. 6 depicts a multipoint inspection system 600, according to another embodiment of the present invention. As shown in FIG. 6, safety guards 602 are provided such that an operator or other person is protected from being struck by the operation of the robotic arm 506 as the robotic arm 506 moves the camera 508 to facilitate inspection of the manufactured assembly 502 within the inspection area. It should be appreciated that the safety guards may be constructed to limit the amount of ambient light in the inspection area, which can enhance the ability of the system 600 to capture an image at one or more of the inspection points.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A multipoint inspection system for evaluating manufactured assemblies, the system comprising:

a robot including a robotic arm and a robot controller for controlling the robotic arm;

a camera mounted to an end of the robotic arm, the camera including a camera controller for capturing images; and a central controller in communication with the robot controller and the camera controller, the central controller providing a positioning signal to the robot controller and a capture image signal to the camera controller, the robot controller causing the robotic arm to position the camera at a first inspection point in response to the positioning signal, the camera controller causing the camera to capture a first inspection point image of a manufactured assembly at the first inspection point and provide an indication to the central controller as to whether the first inspection point image was acceptable, the robotic controller then causing the robotic arm to position the camera at a next inspection point, wherein the camera controller then causes the camera to capture a next inspection point image of the manufactured assembly at the next inspection point and provide an indication to the central controller as to whether the next inspection point image was acceptable.

2. The system of claim 1, wherein the robotic arm is at least a two-axis robotic arm.

3. The system of claim 2, wherein the robotic arm is one of a three-axis to a six-axis robotic arm.

4. The system of claim 1, further including:

a system controller in communication with the central controller, wherein the system controller provides a signal to the central controller that indicates which of a plurality of manufactured assemblies is to be inspected.

5. The system of claim 1, wherein the manufactured assembly is an automotive seat assembly.

6. A multipoint inspection system for evaluating manufactured assemblies, the system comprising:

a robotic arm and a robot controller for controlling the robotic arm; and a camera mounted to an end of the robotic arm, the camera including a camera controller for capturing images, wherein the robot controller is in communication with the camera controller, the robot controller causing the robotic arm to position the camera at a first inspection point, the camera controller causing the camera to capture a first inspection point image of a manufactured assembly at the first inspection point, the robotic controller then causing the robotic arm to position the camera at a next inspection point where the camera controller then causes the camera to capture a next inspection point image of the manufactured assembly at the next inspection point.

7. The system of claim 6, wherein the robot controller and the camera controller are implemented within a single controller.

8. The system of claim 6, wherein the robotic arm is at least a two-axis robotic arm.

9. The system of claim 8, wherein the robotic arm is one of a three-axis to a six-axis robotic arm.

10. The system of claim 6, wherein the manufactured assembly is an automotive seat assembly.

11. The system of claim 6, wherein the camera controller provides the first inspection point image and the next inspection point image to the robot controller which evaluates the images to determine whether the manufactured assembly is acceptable.

12. The system of claim 6, wherein the camera controller evaluates the first inspection point image and the next inspection point image and provides one or more indications to the robot controller as to whether the manufactured assembly is acceptable.

13. The system of claim 6, wherein the robot controller communicates with the camera controller through a central controller.

14. The system of claim 13, wherein the camera controller provides the first inspection point image and the next inspection point image to the central controller which evaluates the images to determine whether the manufactured assembly is acceptable.

15. The system of claim 13, wherein the camera controller evaluates the first inspection point image and the next inspection point image and provides one or more indications to the central controller as to whether the manufactured assembly is acceptable.

16. A multipoint inspection system for evaluating manufactured assemblies, the system comprising:
a robot including a robotic arm and a robot controller for controlling the robotic arm;
a camera mounted to an end of the robotic arm, the camera including a camera controller for capturing images;
a central controller in communication with the robot controller and the camera controller, the central controller providing a positioning signal to the robot controller and a capture image signal to the camera controller, the robot controller causing the robotic arm to position the camera at a first inspection point in response to the positioning signal, the camera controller causing the camera to capture a first inspection point image of a manufactured assembly at the first inspection point and provide an indication to the central controller as to whether the first inspection point image was acceptable, the robotic controller then causing the robotic arm to position the camera at a next inspection point, wherein the camera controller then causes the camera to capture a next inspection point image of the manufactured assembly at the next inspection point and provide an indication to the central controller as to whether the next inspection point image was acceptable; and
a system controller in communication with the central controller, wherein the system controller provides a signal to the central controller that indicates which of a plurality of manufactured assemblies is to be inspected.

17. The system of claim 16, wherein the robotic arm is at least a two-axis robotic arm.

18. The system of claim 17, wherein the robotic arm is one of a three-axis to a six-axis robotic arm.

19. The system of claim 16, wherein the manufactured assembly is an automotive seat assembly.

20. A method for performing multipoint inspection of a manufactured assembly, the method comprising the steps of:
positioning a robotic arm that includes a camera attached to an end of the robotic arm such that the camera is at a first inspection point;
capturing a first inspection point image of a manufactured assembly at the first inspection point;
determining whether the first inspection point image was acceptable;
positioning the camera at a next inspection point;
capturing a next inspection point image of the manufactured assembly at the next inspection point; and
determining whether the next inspection point image was acceptable.

21. The method of claim 19, wherein the robotic arm is one of a two-axis to a six-axis robotic arm.

* * * * *